United States Patent Office 3,201,378
Patented Aug. 17, 1965

3,201,378
POLYMERIZATION PROCESS USING A REACTION VESSEL COATED WITH OXIDIZED ALUMINUM
Charles C. Ketterer, Waynesboro, Va., assignor to E. I. du Pont de Nemours and Company, Wilmington, Del., a corporation of Delaware
No Drawing. Filed Oct. 8, 1962, Ser. No. 229,158
3 Claims. (Cl. 260—85.5)

This invention relates to an improvement in a process for the polymerization of acrylonitrile and monomer mixtures of acrylonitrile and copolymerizable, ethylenically unsaturated monomers. More particularly, this invetion relates to a process for the preparation of polymers, from the aforementioned monomers, which are free of anionic substituents.

In copending applications of Milford et al., Serial Nos. 69,828 and 69,830, filed concurrently on November 17, 1960, now U.S. Patent Numbers 3,065,211 and 3,065,-212, respectively, processes for polymerizing acrylonitrile compositions, in which a peroxy catalyst and an activator selected from the group consisting of 1-thioglycerol and 1-thiosorbitol are used, are described. In the first-mentioned application, a process for the preparation of acrylonitrile/vinyl pyridine polymers which exhibit improved whiteness and color stability and are dyeable with acid dyes is described. In the second-mentioned application, a process for the preparation of acrylonitrile polymers which are resistant to staining by both acid and basic dyes is described. Both processes depend on the utilization of the novel initiator system.

When using the initiator system in the processes just described, considerable difficulty has been experienced due to a build-up of polymer on the walls of the polymerization vessel. This polymer build-up occurs even when using reaction vessels which are generally considered to have inert surface characteristics, e.g., glass, nylon, polyethylene, and stainless steel. The build-up of polymer on the surface of the polymerization vessel yields a heat-insulating film which severely limits the useful life of the vessel between cleanings. Removal of the polymeric coating is not only difficult, but is expensive due to the necessity for terminating the polymerization process during the cleaning step.

It is, therefore, an object of the present invention to provide an improvement in the process for preparing acrylonitrile polymers which are free from anionic substituents. A more specific object of the present invention is to provide a process in which build-up of polymer on the walls of the polymerization vessel is prevented. Other objects will become apparent from the detailed description which follows.

The objects of this invention are accomplished by polymerizing a monomeric composition comprised of a major proportion of acrylonitrile and a minor porportion of a polymerizable monomer selected from the group consisting of a vinyl pyridine and a neutral, ethylenically unsaturated monomer in the presence of a catalyzing amount of a peroxy catalyst and an activator selected from the group consisting of 1-thioglycerol and 1-thiosorbitol in a reaction vessel in which the interior surface, which comes in contact with the monomer composition, is an oxidized aluminum surface. Surprisingly, when using the improved process just described, build-up of polymer does not occur on the walls of the reaction vessel.

The use of the oxidized aluminum surface is a critical feature in the processing of the ingredients just mentioned. If the mixture of ingredients is changed, for example, a redox initiator system is used or an anionic substituent-producing monomer is added, the polymer builds up on the walls of the polymerization vessel. If a reaction vessel having a different interior surface is used, including aluminum, the polymer builds up on the surface.

In carrying out the process of this invention, an aluminum reaction vessel is treated to provide an oxidized surface. A suitable oxidized surface may be obtained by oxidation of aluminum with an alkali or other oxidizing agents or by anodizing the surface using known methods. The thickness of the oxidized coating on the surface is not critical. It is imperative, however, that all of the surface of the vessel which may come in contact with the reaction mixture be coated with aluminum oxide.

In carrying out the process of this invention, the reaction mixture will generally contain a major proportion, preferably at least about 85%, of acrylonitrile and, in preparing acid dyeable polymers, from about 2% to 10% of a vinyl pyridine and up to about 13% of the neutral, ethylenically unsaturated monomer will be used. In the preparation of the stain-resistant polymers, the vinyl pyridine is omitted and the neutral, ethylenically unsaturated monomer content is preferably kept at 8% or below.

By the term "neutral, ethylenically unsaturated monomer" it is meant those monomers which exhibit neither acid nor basic reaction. As used herein, the term "a vinyl pyridine" is intended to include those compounds having the structure

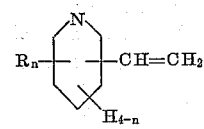

wherein R is an alkyl radical containing from one to four carbon atoms and $n$ is an integer from 0 to 4, inclusive.

In practicing the present invention, aqueous solutions of the monomers may be prepared, and the polymerization carried out under widely varying conditions. For example, polymerization may be carried out in a batch or continuous manner. The polymerization vessel should be well agitated. The temperature of the vessel is maintained in the range from about 15° C. to 70° C., and the pH of the polymerization medium is adjusted to from 2 to 5.

The monomer concentration in the polymerization feeds may vary from about 10% to about 40% by weight, with the preferred concentration being from about 17% to 30% by weight. The amount of catalyst should be in the range from about 0.05% to 20% by weight, based on the weight of the monomers, and preferably from 0.5% to 10% for batch polymerization or for continuous polymerization during steady state conditions when polymer is being collected. For the startup of a continuous polymerization, the concentration of catalyst is preferably held at a high level and may be gradually reduced over a period of a few hours to a lower concentration within the range just mentioned. The activator concentration should be from about 0.1% to 2% by weight, based on the weight of the monomers. Polymers produced by this process have an intrinsic viscosity in the range from 0.8 to 3.0.

The following examples, in which parts and percentages are by weight unless otherwise specified, further illustrate the present invention.

EXAMPLE I

This example describes a preferred treatment for oxidizing the surface of an aluminum polymerization reaction vessel.

A jacketed polymerization reactor, generally cylindrical in shape with tightly fitted top containing inlets for the required reagents and with an outlet so placed as to leave normally about 20% free space, was filled to 90% of its total capacity with a water solution containing 5% sodium carbonate and 1.5% sodium chromate. The outlet was plugged during this treatment. Steam was admitted to the jacket and the treating solution heated to the boil. After boiling for thirty minutes, the solution was removed. The reactor was then filled to 90% of its capacity with a 5% aqueous sodium silicate solution which was boiled for sixty minutes and removed. After thorough washing with demineralized water, the reactor was ready for use.

EXAMPLE II

The treated reactor of Example I was filled to the 40% mark (50% of the working capacity) with demineralized water which had been adjusted to pH 3.2 with sulfuric acid. By means of water circulated through the jacket, the temperature of the reacting mass was controlled at $40\pm1°$ C. initially and throughout the run. The following reagents were added continuously at such a combined rate as would fill the reactor to overflow in sixty minutes.

*Table 1*

| | Parts |
|---|---|
| Monomer (91.2% acrylonitrile, 5.8% methyl acrylate, 3.0% methyl vinylpyridine) | 20 |
| 1-thioglycerol (as a 1% water solution) | 0.3 |
| Hydrogen peroxide (as a 1% water solution) | 1 |
| Iron (added as ferrous ammonium sulfate) p.p.m. | 1 |
| Water (containing the amount of sulfuric acid required to control pH at $3.2\pm1$) | 77.7 |

After seven hours of continuous operation, the reaction was terminated and the reactor inspected. There was no build-up of polymer on the treated surfaces which retained the original, dull gray appearance of the freshly treated reactor. During the last four hours of the polymerization run, the product had an intrinsic viscosity average of 1.5 as measured in dimethylformamide at 25° C.

In larger scale experiments, the reactor surface of this example was inspected at the end of eighteen days of continuous polymerization. The surface retained its original, dull gray appearance. There was no polymer build-up on the surface.

EXAMPLE III

This example illustrates the inadequacy of various materials of construction in polymerization reactors for the production of anionic substituent-free polymers of acrylonitrile.

The ingredients specified in Example II were polymerized in the presence of surfaces of various materials described in the table which follows. In only one case, i.e., when the surface had an aluminum oxide coating provided by anodic oxidation, did the surface remain free of an adherent polymer deposit.

*Table 2*

| Surface material: | Polymer coating |
|---|---|
| Anodized aluminum | No |
| Aluminum | Yes |
| Glass | Yes |
| Nylon | Yes |
| Polyethylene (flexible) | Yes |
| Polyethylene (rigid) | Yes |
| Silicone grease-lined reactor | Yes |
| Stainless steel | Yes |
| "Mylar"[1] | Yes |
| "Teflon"[1] | Yes |
| "Teflon"[1] coated aluminum | Yes |

[1] "Mylar" and "Teflon" are registered Du Pont trademarks for polyester film and polyfluorocarbon polymers, respectively.

EXAMPLE IV

This example illustrates the use of the treated aluminum reactor of Example I for production of polyacrylonitrile which has neither anionic nor cationic substituents. Such polymer is resistant to both cationic and anionic dyes.

Continuous polymerization of acrylonitrile homopolymer was carried out, using the conditions and composition outlined in the table which follows. The polymerization reactor was initially half filled with demineralized water containing iron and sulfuric acid in the amount recited in the tabulated recipe which follows. After heating to the temperature indicated, the polymerization reagents were added with sufficient demineralized water to maintain the recipe composition. The polymerization proceeded without build-up of polymer on the reactor surface.

*Table 3*

| | | |
|---|---|---|
| Acrylonitrile monomer fed (BOT) | percent | 17 |
| Hydrogen peroxide (as a 1% solution in water (BOM) | do | 1 |
| Thioglycerol (as a 1% solution in water) (BOM) | do | 0.3 |
| Iron (fed as ferrous ammonium sulfate) (BOT) | p.p.m. | 1 |
| Residence time | minutes | 60 |
| Temperature | °C. | 50 |
| pH | | $3.6\pm0.1$ |
| Conversion | percent | 55 |
| Intrinsic viscosity | | 1.5 |

BOT=Based on total ingredients.
BOM=Based on monomers.

EXAMPLE V

This example illustrates the use of the reactor of this invention in preparation of acrylonitrile polymers which have combined anionic functions.

The reactor of Example I, after treatment as in that example, was used for preparation of a copolymer of acrylonitrile with 3.7% sodium styrenesulfonate. The procedure was the same as employed in Example II, the following feeds (parts of active ingredients) being employed.

*Table 4*

| | Parts |
|---|---|
| Acrylonitrile | 22. |
| Sodium Styrenesulfonate (as a 2% water solution) | 0.67. |
| Potassium persulfate (as a 2% water solution) | 0.057. |
| Sodium bisulfite (as a 10% water solution) | 0.453. |
| Iron (added as ferrous ammonium sulfate) | $2\times10^{-5}$. |
| Water (containing the amount of sulfuric acid to control pH of the reaction at $3.2\pm0.1$) | 76.8 (total). |

After seven hours of continuous operation, the reactor was drained and examined. The entire surface of the reactor was found to have a tenacious, hard, horny deposit of polymer which required complete reactor disassembly and mechanical abrasion to remove.

The experiment was repeated except that a vinyl pyridine was substituted for the sodium styrenesulfonate. The polymer built up on the reactor surface.

In another experiment, a vinyl pyridine in an amount of 3.0 parts was included in the reaction mixture. A similar build-up of polymer on the reactor surface resulted.

It has been found that times of treatment with the alkaline chromate solution and the sodium silicate solution as short as five minutes and fifteen minutes, respectively, are adequate for the objects of this invention, although yielding a somewhat less durable oxide coating. Any anodizing process is adequate which results in oxidation of the entire interior surfaces of the reactor which are to be contacted by the polymerization medium.

Any of the many known neutral, ethylenically saturated monomers which are copolymerizable with acrylonitrile may be used in the present process, e.g., ethyl acrylate, methy methacrylate, ethyl methacrylate, etc., vinyl acetate, vinyl propionate, styrene, vinylidene chloride, acrylamide, methyl acrylamide, t-butyl acrylamide, methyl vinyl ketone, etc.

Examples of suitable vinyl pyridines include 2-vinyl pyridine, 2-methyl-5-vinyl pyridine, 4-vinyl pyridine, and 2-vinyl-6-methyl pyridine.

In addition to the peroxy catalysts specifically illustrated in the examples, other mild peroxy catalysts may be utilized, such as benzoyl peroxide, acetyl peroxide, lauryl peroxide, oleoyl peroxide, and triacetone peroxide.

In adjusting the pH of the polymerization medium, any number of acids may be utilized, for example, nitric, sulfuric, and phosphoric acid; carboxylic acids such as acetic acid; sulfonic acids such as methane sulfonic acid, as well as other acids which are neither oxidizable nor reducible.

The principal advantage of the process of this invention lies in the relative freedom from reactor down-time normally associated with production of anionic substituent-free acrylonitrile polymers. Although not fully understood, it appears that the tendency of polymer to build up on the various types of surface may be related to the fact that polymers prepared with mild peroxy compounds and either thiosorbitol or thioglycerol as initiators have an electro-positive charge as formed in an aqueous suspension. Acrylonitrile polymers prepared with the usual redox initiator, such as potassium persulfate and sodium bisulfite, have an electronegative charge as formed in aqueous dispersion. The positive charge on anionic substituent-free polymers is present whether or not the polymer contains a cationic substituent.

As many widely different embodiments of this invention may be made without departing from the spirit and scope thereof, it is to be understood that this invention is not to be limited to the specific embodiments thereof except as defined in the appended claims.

I claim:

1. In a process for polymerizing a monomer composition comprised of a major proportion of acrylonitrile and a minor proportion of a copolymerizable monomer selected from the group consisting of a vinyl pyridine and a neutral ethylenically unsaturated monomer in the presence of a catalyzing amount of a peroxy catalyst and an activator selected from the group consisting of 1-thioglycerol and 1-thiosorbitol, the improvement which comprises polymerizing said monomer composition in a reaction zone substantially bounded by oxidized aluminum.

2. In a process for polymerizing a monomer composition comprised of from about 92% to 100% acrylonitrile and up to 8% of a copolymerizable neutral ethylenically unsaturated monomer in the presence of a catalyzing amount of a peroxy catalyst and an activator selected from the group consisting of 1-thioglycerol and 1-thiosorbitol, the improvement which comprises polymerizing said monomer composition in a reaction zone substantially bounded by oxidized aluminum.

3. In a process for polymerizing a monomer composition comprised of from about 85 to 98% acrylonitrile, about 2 to 10% of a vinyl pyridine, and up to about 13% of a neutral ethylenically unsaturated monomer copolymerizable with said acrylonitrile and said vinyl pyridine in the presence of a catalyzing amount of a peroxy catalyst and an activator selected from the group consisting of 1-thioglycerol and 1-thiosorbitol, the improvement comprising polymerizing said monomer composition in a reaction zone substantially bounded by oxidized aluminum.

References Cited by the Examiner
UNITED STATES PATENTS

| | | | |
|---|---|---|---|
| 1,946,151 | 2/34 | Edwards | 23—252 |
| 2,456,360 | 12/48 | Arnold | 260—88.7 |
| 2,635,090 | 4/53 | Basdekis | 260—88.7 |
| 2,793,199 | 5/57 | Kurtz | 260—88.7 |
| 2,847,447 | 8/58 | Steadman et al. | 23—252 |
| 3,065,211 | 11/62 | Milford et al. | 260—85.5 |
| 3,065,212 | 11/62 | Milford et al. | 260—88.7 |

JOSEPH L. SCHOFER, *Primary Examiner.*

DONALD E. CZAJA, *Examiner.*